United States Patent [19]

McAllister

[11] Patent Number: 5,512,887
[45] Date of Patent: Apr. 30, 1996

[54] PERSONAL IDENTIFICATION, ACCESS CONTROL AND MONITORING SYSTEM

[75] Inventor: Clarke W. McAllister, Corvallis, Oreg.

[73] Assignee: First Tracks, Eugene, Oreg.

[21] Appl. No.: 7,649

[22] Filed: Jan. 22, 1993

Related U.S. Application Data

[62] Division of Ser. No. 700,215, May 13, 1991, Pat. No. 5,266,783.

[51] Int. Cl.⁶ ..................................... H04Q 1/00
[52] U.S. Cl. .............................. 340/825.34; 340/825.31; 235/492
[58] Field of Search .................... 340/825.34, 825.31, 340/825.54; 235/492

[56] References Cited

U.S. PATENT DOCUMENTS

| | | | |
|---|---|---|---|
| 3,891,980 | 6/1975 | Lewis et al. | |
| 4,048,986 | 9/1977 | Ott | 340/825.31 |
| 4,129,855 | 12/1978 | Rodrian | |
| 4,189,712 | 2/1980 | Lemelson | 340/825.31 |
| 4,354,189 | 10/1982 | Lemelson | 340/825.31 |
| 4,453,161 | 6/1984 | Lemelson | 340/825.31 |
| 4,509,093 | 4/1985 | Stellberger | 340/825.54 |
| 4,591,854 | 5/1986 | Robinson | 340/825.31 |
| 4,897,644 | 1/1990 | Hirano | 340/825.31 |
| 5,028,918 | 7/1991 | Giles | 340/825.54 |

FOREIGN PATENT DOCUMENTS

| | | | |
|---|---|---|---|
| 0061373 | 9/1982 | European Pat. Off. | 340/825.31 |
| 2082804 | 3/1982 | United Kingdom | 340/825.31 |
| 2137733 | 10/1984 | United Kingdom | 340/825.31 |

*Primary Examiner*—Brian Zimmerman
*Attorney, Agent, or Firm*—Kolisch Hartwell Dickinson McCormack & Heuser

[57] ABSTRACT

An environmentally tolerant personal identification, access control and monitoring system including a dual contact limb-worn identification (ID) code-producing unit and a multiple-physical contact arrayed ID code reader are described. Momentary physical contact between the unit's dual contacts, in any position and orientation, and the reader's arrayed multiple contacts is detected by sequentially energizing contact pairs of the array until a characteristic low-impedance is sensed and then the indicated contact pair is reverse-energized to read the ID code from the ID unit. Preferably, the contact array geometry is of closely spaced, nickel-plated, planar, hexagonally shaped conductors that are group-encoded and -energized to minimize the input/output port requirements of a microprocessor and associated drive/sense electronics that accomplish the scanning of the array and the reading of the ID unit. False-positive indications of physical contact by an ID unit are avoided by the preferred sensing method, which can distinguish therefrom a condition in which adjacent contacts in the array incidentally are bridged, e.g. by a buildup of ice on the ID reader's contact array. ID codes may be used to collect person-tracking information, as well as to limit access to a person wearing a properly encoded ID unit.

18 Claims, 3 Drawing Sheets

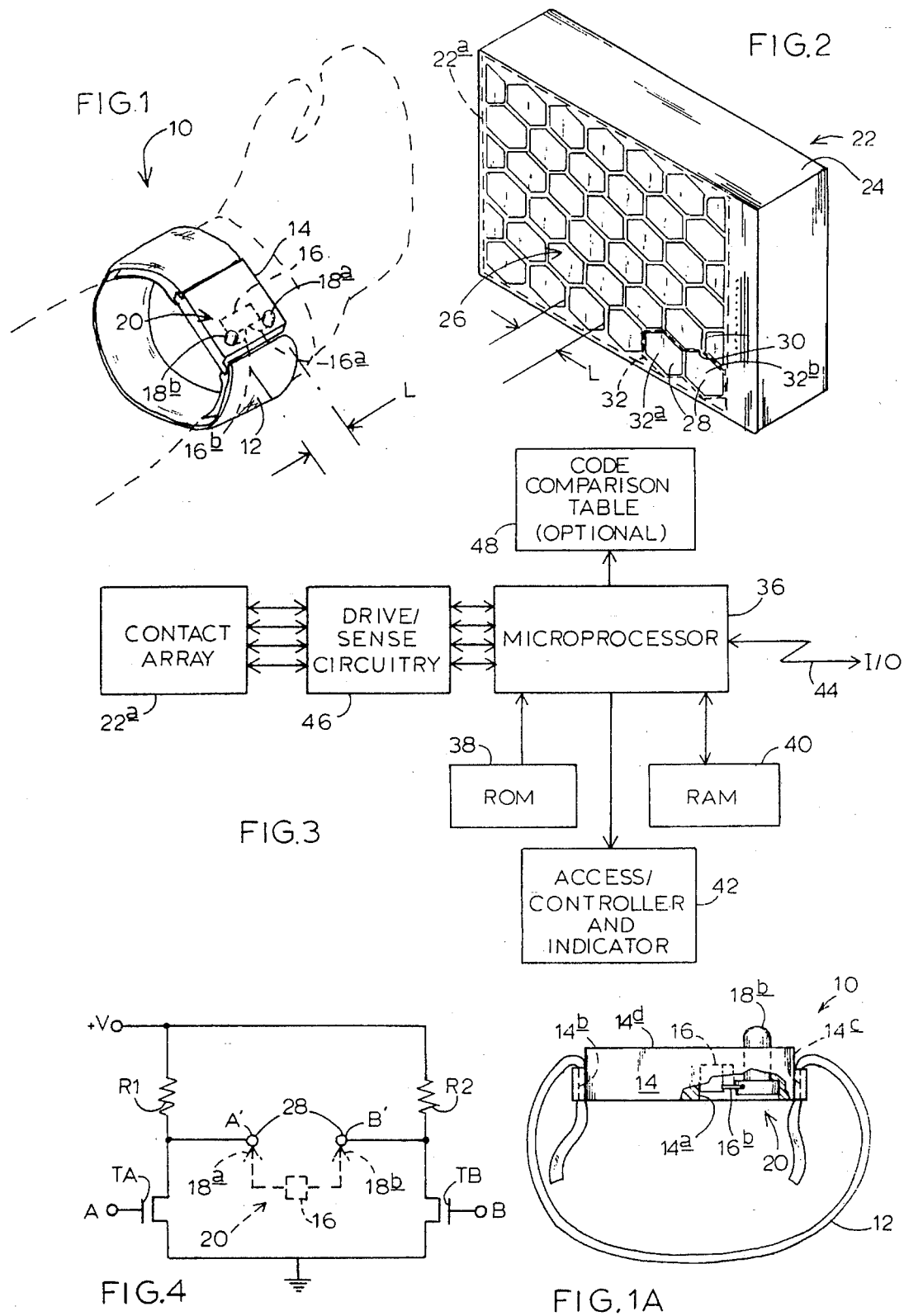

PERSONAL IDENTIFICATION, ACCESS CONTROL AND MONITORING SYSTEM

This is a divisional of application Ser. No. 07/700,215 filed May 13, 1991, now U.S. Pat. No. 5,266,783.

BACKGROUND AND SUMMARY OF THE INVENTION

This invention relates generally to personal identification (ID), access control and monitoring systems involving an ID reader and an ID unit: responsive thereto for ID code processing and verification. More particularly, the invention relates to a system involving position- and orientation-tolerant, physical contact between a two electrical contact ID unit preferably worn on the person and a multiple electrical contact ID unit detector and ID reader, the system having been found to be particularly effective in controlling and monitoring the whereabouts of snow skiers.

Prior art ID, access and inventory control systems involve various contact and non-contact configurations in which an article or person passes a checkpoint and it is identified and/or is allowed or denied entry based on predetermined control criteria. Exemplary of a non-contact system are point-of-sale bar-code readers used in merchandising outlets such as grocery stores by which purchased articles are identified, priced and inventory-controlled. Exemplary of a contact system are magnetic card readers used in secure facilities that verify the authority of a cardholder to enter or depart a controlled area by which a lock on a door automatically may be released and failing which entry is denied. These and other systems rely upon the controlled manipulation of an article carrying the identifying marks, whether it be a purchased article or a card. Such systems are error-prone, even in the relatively controlled environments in which they typically are found, because they depend upon some form of radio frequency (RF) signal, optical, magnetic or acoustic coupling through a medium such as air between the ID-encoded media and the media reader.

In harsh environments such as snow ski areas, where moisture, sub-zero temperatures and electromagnetic interference (EMI) from nearby ski lifts have rendered access control and monitoring systems particularly unreliable, there is yet a need reliably to control access to lifts and to monitor the whereabouts of skiers. Skiers of different sizes and ski levels—all subject to cold weather and laden with clothing and ski equipment that restricts their mobility and dexterity—must pass checkpoints, e.g. ski lift entry points, to gain access to the slopes. While they tend to relieve the skier of this volitional burden, mechanical systems by which, for example, a lift ticket is verified and punched or a bar code thereon is read by a wand are ski resort staff labor-intensive. Automatic ID scanning systems that attempted to utilize RF, optical, acoustic or magnetic coupling or telecommunication between an ID-encoded medium and an ID medium reader would be subject to the reliability problems described above, which problems would be heightened by environmental concerns.

Accordingly, it is a principal object of the present invention to provide an automatic personal ID, access control and monitoring system suitable for use in harsh environments such as snow ski areas.

Another important object of the invention is to provide such a system that imposes no unreasonable requirements or constraints on a snow skier.

Yet another object is to provide such a system that includes a wearable ID-encoded unit having two electrical contacts and an ID reader having multiple, two-dimensionally arrayed electrical contacts whereby the latter provides a large-area target for the casual skier to impact with the ID-encoded unit contacts.

An also important object is to provide such a system that is capable of reliably verifying a skier's authority to pass a checkpoint regardless of the position or orientation of the ID-encoded unit.

Still another object of the invention is to provide such a system at reasonable cost.

Briefly summarized, the invention is a personal ID, access control and monitor system found to be particularly useful in ski lift ticketing and boarding applications. The system in accordance with its preferred embodiment includes a skier limb-worn armband ID device having a conventional integrated circuit (IC) ID code generator and dual spaced electrical contacts cooperative with a multiple electrical contact detector array and associated electronics that, upon even momentary contact by the armband contacts, in virtually any position or orientation, is capable of accurately and reliably reading the IC ID code and determining by comparison to a computer access control data base whether the skier has access authority to a nearby ski lift.

These and other objects and advantages of the invention will be more clearly understood from a consideration of the accompanying drawings and the following description of the preferred method and embodiment.

BRIEF DESCRIPTION OF THE DRAWINGS

FIG. 1 is an isometric view of an ID unit constructed in accordance with the preferred embodiment of the invention, of which Detail 1A shows a fragmentary side elevation.

FIG. 2 is an isometric view generally corresponding to that of FIG. 1 and showing an ID reader used with the ID unit to read an ID code therefrom.

FIG. 3 is a schematic block diagram showing the electronics associated with the ID reader of FIG. 2.

FIG. 4 is a simplified equivalent circuit diagram illustrating the means by which the ID reader senses and reads the ID unit.

DETAILED DESCRIPTION OF THE PREFERRED EMBODIMENT

Figure 5:
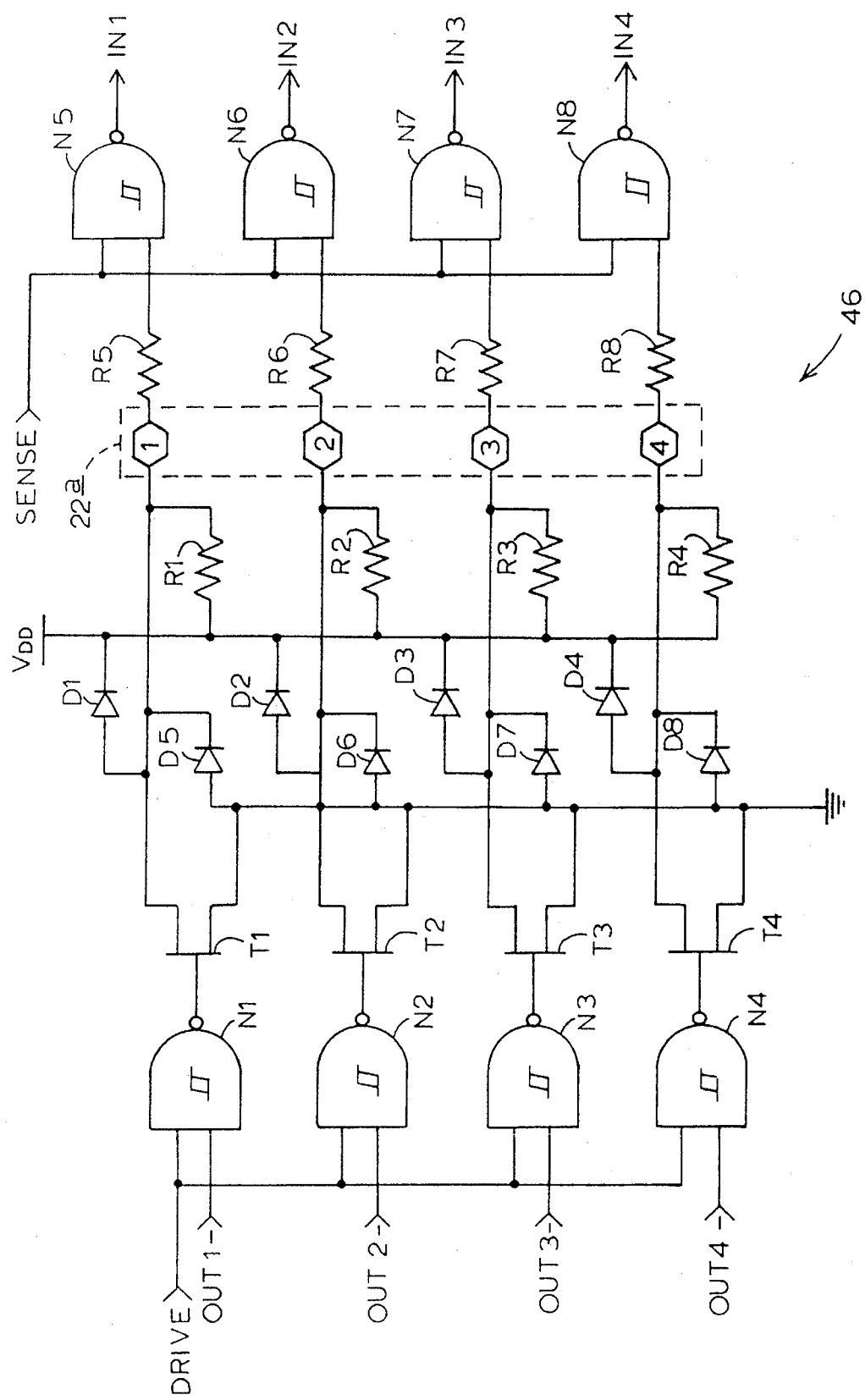
FIG. 5 is a detailed schematic diagram that illustrates the sense/drive circuit shown in FIG. 3.

Referring initially to FIG. 1, a first, portable, preferably user-wearable, and in use most preferably limb-worn ID unit 10 is shown. ID unit 10 preferably includes a wrist-, leg- or arm-band 12 suitably connected to a housing or substrate 14, which mounts a twin-lead ID code-producing integrated circuit (IC) 16 (indicated by dashed lines in FIG. 1), a pair of operative leads or terminals 16a and 16b of which are electrically connected to dual, spaced, electrical, so-called "point" contacts 18a, 18b. Housing 14 and ID IC 16 (including leads 16a and 16b) operatively connected with the pair of spaced contacts 18a, 18b will be referred to herein as an external-circuit coupler, or circuit-coupling structure or means, indicated generally at 20.

Point contacts 18a, 18b preferably present small-pattern contact surface areas at their distal ends, which extend outwardly and preferably at right angles from housing 14. It has been found to be most effective if contacts 18a, 18b are protuberant, as shown in FIG. 1 and Detail 1A, and are spherically or spheroidally shaped in their distal ends, for physically and electrically engaging a code reader to be described by reference to FIG. 2. For best conductivity, durability and matability, each of contacts 18a, 18b may be of solid brass which is tin-plated on a proximal end for soldering to one of terminals 16a, 16b and which is nickel-plated on the distal end for engaging the code reader. As will be seen, it is the small-pattern contact surface areas of contacts 18a, 18b—relative to the large-pattern planar plural contacts array of the code reader-that invokes the "point" characterization of the contacts of unit 10.

IC 16 preferably is a solid-state device providing for the non-volatile storage (e.g. in a masked or programmable read-only memory (ROM or PROM)) of a code and for its retrieval responsive to defined electrical conditions on operative leads 16a, 16b. IC 16 is capable of producing, in response to a pair of interrogation signals impressed upon leads 16a, 16b, a signal bearing a preprogrammed serial number or like identification code. A suitable device for use as IC 16 would be device type DS2400, which is available from Dallas Semiconductor of Dallas, Tex. in a three-lead, TO-92 package, the third lead (not shown in FIG. 1) of which has no operative connection with the IC's circuitry. It will be appreciated that any suitable device 16 may be used that is capable, when interrogated by a code reader (such as that described below), of producing a signal bearing an identification code, and any suitable means provided for preferably rigidly mounting the same in such manner that it may be intimately associated with, and preferably securely attached to, the person, clothing, equipment or accessories of a user, e.g. a skier.

In accordance with the preferred embodiment of the invention, unit 10 includes suitable means, e.g. elastic strap 12, connected with the housing which mounts circuit coupling structure 20, for extending at least partially around a limb of a user, as indicated in FIG. 1. Alternatively, it will be appreciated that the housing which mounts circuit coupling structure 20 may be made an integral part of a user's clothing, e.g. a ski glove or jacket; equipment, e.g. skis or ski boots; or accessories, e.g. an armband, sew-in patch or clip-on badge. Importantly, unit 10 is lightweight and portable, and has its terminals 18a, 18b in preferably rigidly maintained, spaced position relative to one another. Preferably, unit 10 is positioned for use relative to the user in a lateral region of the outerwear or equipment of the user such that it may be easily presented when needed for access to a secured area such as a ski lift.

Referring briefly to Detail 1A, unit 10 is shown in front elevation and partial cutaway view to better illustrate its detailed structure. Housing 14 may be seen to have formed therein a cavity 14a, including a through hole, which accommodates IC 16 and the bodies or posts of point contacts 18a, 18b to which terminals 16a, 16b are rigidly connected by any suitable means, e.g. soldering. It will be appreciated that casting compound may be poured into cavity 14a around these components to seal circuit coupling structure 20 from environmental elements, with only the distal ends, preferably between approximately ⅛-inches and ¼-inches long, of point contacts 18a, 18b being exposed as shown. Housing 14 also preferably is provided with rectangular slots 14b, 14c, which are dimensioned to permit the free ends of elastic strap 12 to be inserted therethrough and adjusted to an individual user, while securely capturing the same. Housing 14 preferably has a outer, generally planar surface 14d adjacent point contacts 18b for mounting a photograph of its authorized user, which photograph may be securely laminated to the surface 14d to prevent tampering. Housing 14 may be formed of any suitable, preferably polymeric material, e.g. it may be injection-molded plastic.

Turning now to FIG. 2, another, or second, unit 22 interactable with one, or first, unit 10, is shown. Second unit 22 is referred to herein as a code reader because it is capable of reading the code produced by code-producing unit 10. Code reader 22 preferably comprises a housing 24 and code-reading means including target contact means 26 and associated electronics not shown in FIG. 2 but shown in pertinent part in FIGS. 3 and 5 (as well as conventional power supply means and power and signal distribution means such as cables and/or wiring harnesses, not shown). Target contact means 26 includes spaced, plural, generally planar, preferably polygonal contacts such as contact 28 that are arranged preferably regularly to form an active sensor expanse, or two-dimensional plural contact array 22a that is disposed on an outer, facing surface of housing 24.

Each contact 28, which is electrically conductive and which may be made of nickel-plated copper (by processes compatible with the manufacture of the double-sided or two-layer printed circuit board (PCB) on which contacts 28 preferably are formed, with signal routing to a cable connector area via lands on the reverse side of the PCB connected to contacts 28 by properly placed plated-through holes), is electrically connected via conventional PCB connectors and cabling with portions of a drive/sense circuit that, as will be seen, is part of electronics 28. Pairs of adjacent contacts 28 are interposed by electrically insulative spaces or gaps 30, thereby forming on expanse 22a a planar, plural-contact grid that acts, in accordance with the invention, as a substantially extensive target area for engagement by unit 10. As shown in FIG. 2, the collective surface area of plural contacts 28 substantially covers the surface of array 22a, while the collective surface area of spaces 30 covers only an insubstantial fraction of the surface thereof.

In accordance with the preferred embodiment, the PCB on which contacts 28 are formed has a second layer or circuit clad side including the interrogation/response signals that energize the contact array and any circuit coupling structure engaged therewith. In order to prevent the buildup of ice on outer, exposed expanse 22a, the PCB is heated by a DC signal that is routed substantially over the entire inner surface thereof. The serpentine, back-and-forth, elongate path of the heater signal line preferably is structured to exhibit a 24-$\Omega$ resistance (and negligible inductance), and is energized by a 24-volt DC voltage to produce approximately one amp of heating current. A heater pattern consisting of 10- or 12-mil parallel lines on 25-mil centers, wherein the alternate lines are connected on alternate ends thereof to produce a single, continuous conductive path between ground and the energizing DC voltage has been found to be effective. Thus, code reader 22 preferably includes what may be referred to as means for heating expanse 22a to prevent the buildup of ice thereon that otherwise might result in short-circuiting between adjacent planar contacts 28.

Planar contacts 28 collectively may be thought of as means defining an active sensor, response production expanse 22a having plural pairs, e.g. pair 32 indicated by dashed lines in FIG. 2, of spaced external-circuit-coupleable response structure, or zones, 32a, 32b each of which is defined by and is coextensive with a corresponding contact 28. Alternatively, planar contacts 28 may be thought of as defining an array of energizable planar contact pairs. It will be appreciated that the inventive code reader system comprises as few as three contacts such as contact 28 properly dimensioned and arranged (e.g. triangularly) to define a two-dimensional active sensor expanse having at least two and as many as three pair-wise-couplable response zones any two of which would be couplable by an external circuit coupling structure such as structure 20, as by engagement of point contacts 18a, 18b with active sensor expanse 22a brought about by passing-motion, electrical-physical contact therebetween, e.g. by a wearer of ID unit 10 skiing past, and initiating momentary contact with, code reader 22.

Contact array 22a may be described alternatively as large-target contact means which includes spaced, plural, generally planar contacts 28 arrayed in two dimensions at least one of which is substantially greater than the space L between point contacts 18a, 18b of code-producing unit 10. In the preferred embodiment of the invention, contacts 28 are arrayed in two dimensions both of which are substantially greater than such space L, as may be seen from FIG. 2, thereby to provide a target that is substantially expansive in two dimensions to facilitate engagement anywhere within expanse 22a by point contacts 18a, 18b of ID unit 10. Providing a large target area as described and illustrated renders it much more convenient for users, e.g. skiers having different builds, agilities and skills, positively to make the slight and momentary contact that may be necessary to gain access to a secured area, or to be identified or monitored as to their whereabouts.

Typically, each skier would be equipped with a uniquely serial number-identifying ID unit 10, preferably intimately connected with the skier's clothing or equipment and therefore referable to as a garment item, and a ski resort would have more than one code reader, or what may be thought of as an identifying station, 22, used by each skier, and even the momentary engagement in any of an infinite variety of positions with the station's response production expanse 22a by the garment item completes a circuit within the identifying station, thereby effecting identification of the skier, or at least of the garment item worn by the skier, to the station. Thus cooperation between first unit 10 and second unit 22 operatively couples code-producing means 16 with code-reading means, i.e. drive/sense circuitry 34 cooperative with microprocessor 36, so that second unit 22 responds to the coded signal produced by first unit 10.

It is noted that the given or nominal spacing between point contacts 18a, 18b is shown in FIG. 1 as being equal to a distance L. It is noted that the nominal distance from a given edge portion of a first one of plural contacts 28 to a non-adjacent corresponding edge portion of an adjacent one of plural contacts 28 also is approximately equal to L, the given spacing of dual point contacts 18a, 18b. This relative spacing between adjacent contacts of units 10, 22 is important in realizing a principal advantage of the invention: unit 10, in substantially any condition in which each of contacts 18a, 18b even momentarily engages active sensor expanse 22a, is operative to complete a circuit within code reader 22, i.e. effects circuit coupling between at least one pair of couplable response zones 28.

Figure 7:
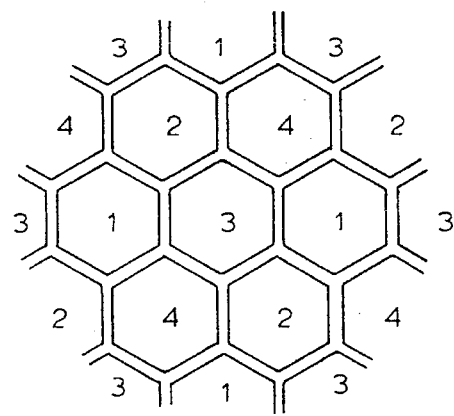
FIG. 7 schematically illustrates the detailed geometry and group coding of the ID reader's contact array.

It has been determined that a preferred shape for each of identically shaped contacts 28 is that of a regular, or equilateral and equiangular polygon, e.g. the illustrated hexagon of FIGS. 2 and 7. Other shapes, e.g. squares, equilateral triangles or even circles, may be used to various degrees of success in achieving high performance operation of the system, which generally is characterized by sensitivity to dual point contact by unit 10 and tolerance for incidental bridging. A hexagon provides superior performance because it achieves a high overall contact packing density or fill ratio, uniform inter-contact spacing and a desirably high ratio (0.866) between the minimum surface dimension (between opposite sides) and the maximum surface dimension (between opposite vertices) of each contact. In accordance with the preferred embodiment of the invention, L= 0.75-inches and the space between adjacent contacts 28 is 0.05-inches, although those of skill will appreciate that any suitable dimensions are possible, and are within the spirit of the invention.

Turning next to FIG. 3, a simplified block diagram of the electronics associated with code reader 22 is shown. It will be appreciated that certain clocking, gating, latching and buffering details are omitted for the sake of clarity, which detailed circuitry is conventional and forms no part of the invention. It will also be appreciated that miscellaneous drive or sense circuitry may be provided in support of auxiliary control or indication functions. A code reader controller indicated generally at 34 preferably includes a microprocessor 36 having at least four preferably parallel data input and output ports, a ROM 38 which may be programmable, a read-and-write memory (RAM) 40, access controller and indicator logic 42, a serial input/output (I/O) port 44, contact drive/sense circuitry 46, and contact array 22a. A code comparison table 48 (which may simply be a dedicated portion of RAM 40) may be provided if it is desired to locally process identification codes read by code reader 22 to determine whether the user of unit 10 is authorized to access the secure area, in which case microprocessor 36 would perform comparisons between the code read from unit 10 and those downloaded into lookup table 48. Alternatively, microprocessor 36 may simply upload to a central processor (not shown) the codes read from unit 10 for a determination whether the user's access is authorized.

Data base management techniques may be used to create and maintain data base libraries containing identification or serial number information corresponding to every ID unit 10 that is lawfully issued, as well as access authority and demographic or other useful information regarding the person to whom the same was issued. In this way, a skier, for example, wishing to gain access to a ski lift would make passing-motion contact between both point contacts 18a, 18b of ID code-producing unit 10 and contact array 22a of code reader 22, and would either be denied or granted access via the selective automatic release of a locked gate or turnstile by access controller logic A2, or via the selective manual release thereof by ski resort staff who are monitoring aural or visual indicator logic 42. Such data processing and control readily may be accomplished by conventional techniques such as are commonly known to those skilled in the art.

FIG. 4 is of a simplified, equivalent circuit that is believed to be helpful in understanding the principle of operation of drive/sense circuitry 46. A and B represent logic signals that would be controlled independently, for example, by microprocessor 36 to control the gates of, and thereby to turn on or off, field-effect transistors (FETs) TA, TB. A logic high voltage level V+ is connected through pull-up resistors R connected to the drain of common-source-connected FETs TA, TB. The drains of FETs TA, TB also are connected as shown to an adjacent pair of planar contacts A', B', which correspond for illustrative purposes to contacts 28 code reader 22. Finally, a circuit coupling structure equivalent to structure 20 including ID IC 16 and connected point contacts 18a, 18b is shown to be at least momentarily physically and electrically engaging planar adjacent planar contacts A', B'.

It may be seen from FIG. 4 that if A is pulled low while B is driven or allowed to float high, then with circuit coupling structure 20 (which is roughly equivalent to a diode and thus is characterized by a low impedance, when forward biased, relative to the open-circuit impedance of electrically insulated contacts A', B') engaging adjacent contact pair A', B' in one orientation a low level voltage will appear at contact B' which could be sensed, for example, by microprocessor 36. Alternatively, if B is pulled low while A is driven or allowed to float high, then with circuit coupling structure 20 engaging adjacent contact pair A', B' in a second, reverse orientation a low level voltage will appear at contact A', which also could be sensed by microprocessor 36. Thus the engagement of circuit coupling structure 20 with adjacent contact pair A', B' is sensed regardless of orientation by sequentially impressing on terminals A, B signal pairs defining a first given polarity and then a second reverse polarity.

Engagement of an adjacent contact pair A', B' by circuit coupling structure 20 can be distinguished also from a short-circuit condition, as might be caused by incidental bridging of adjacent contacts A', B', as indicated by a dashed line therebetween. This may be accomplished by first determining that a low-impedance condition between contacts A', B' exists, as above described, and then by impressing a reverse polarity signal pair on the same two contacts A', B'. A short circuit will exhibit a low impedance condition regardless of the polarity of the voltage impressed on terminals A', B', whereas engagement by circuit coupling structure 20 will exhibit a low impedance with its internal diode forward-biased and a high impedance with its internal diode reverse-biased. This abnormal condition, which might indicate a buildup of ice on the contact array of the code reader, may be ignored thus avoiding a false-positive indication of engagement between adjacent contact pair A', B' and the point contacts of circuit coupling structure 20. Upon reversal of the polarity of the signal pair impressed upon terminals A', B' in accordance with this second, conditionally executed step, circuit coupling structure 20 with the internal diode of IC 16 reverse-biased is in its normal operating mode and is ready to be read by code reader 22.

Turning now to FIG. 5, drive/sense circuitry 46 in its preferred embodiment is described. It may be seen from FIGS. 3 and 5 that only four drive/sense paths are provided for all contacts 28 of plural contact array 22a. This yields many advantages, in that it significantly reduces the drive/sense circuitry and signal wire harness requirements of code reader 22. It also makes it possible to utilize a microprocessor having as few as four input and four output (or four common, bidirectional input/output) data ports. In order to detect engagement by circuit coupling structure 20 anywhere on plural contact array 22a, which as illustrated in FIG. 2 may have thirty-nine or more (or fewer) contacts 28, it is necessary to define groups of contacts 28 and to drive/sense those within the same group in parallel.

In accordance with the preferred embodiment, four groups of contacts are defined and their arrangement within contact array 22a is optimized in a pattern that results in maximal spacing between any two of the same group. With this group coding arrangement, the four groups of contacts 28 may be driven and sensed, or interrogated, together, in accordance with the principles discussed above in reference to FIG. 4, in order to detect engagement by circuit coupling structure 20 with a pair of adjacent contacts 28 anywhere and any orientation within contact array 22a. FIG. 5 now straightforwardly may be understood to provide four drive signals OUT1-, OUT2-, OUT3-, OUT4- (the - suffix indicating low-active signals by positive-true logic conventions) and four sense signals IN1, IN2, IN3, IN4 corresponding, respectively, to four contact groups 1, 2, 3, 4 (and indicating the inverse of the logic levels to which the contact groups are being driven). A drive gate signal DRIVE enables a low-active selected one of drive signals OUT1-, OUT2-, OUT3-, OUT4- when a logic zero to turn on a selected one of four FETs T1, T2, T3, T4 via Schmitt-triggered drive NAND gates N1, N2, N3, N4.

The open drains of common-source connected FETs T1, T2, T3, T4 are connected in parallel via diodes D1, D2, D3, D4 to $V_{DD}$ and to contact groups 1, 2, 3, 4 (each of which includes plural contacts that are arranged, as will be described in relation to FIG. 7, in spaced relationship to one another across expanse 22a), and thus represent signals which, when considered as pairs, may be thought of as representing interrogation signal pairs that are produced by interrogation signal-producing means—i.e. drive/sense circuitry 46 cooperative with microprocessor 36 and a program executing in ROM 38 and/or RAM 40-and are impressed on adjacent ones of planar contacts 28 of code reader 22 and, with ID unit 10 in engagement therewith, also on point contacts 18a, 18b thereof. Four additional diodes D5, D6, D7, D8 are connected between the common sources and the drains of FETSs T1, T2, T3, T4. Contact groups 1, 2, 3, 4 are connected via resistors R1, R2, R3, R4 to $V_{DD}$ and via resistors R5, R6, R7, R8 to first inputs of Schmitt-triggered sense NAND gates N5, N6, N7, N8 the second inputs of which are connected in parallel with a sense gate signal SENSE (providing for a self-test mode of operation) to produce IN1, IN2, IN3, IN4, respectively.

Persons skilled in the art will appreciate that associated resistors R1, R2, R3, R4 pull up to a logic one the various first inputs to corresponding NAND gates N5, N6, N7, N8 so long as the corresponding contact group 1, 2, 3, 4 is not effectively grounded by the programmed turning on of the corresponding FET T1, T2, T3, T4. Associated resistors R5, R6, R7, R8 current limit the input voltages to the various first inputs to NAND gates N5, N6, N7, N8 to protect those logic devices from transients or other over-voltage conditions that might be inadvertently impressed on contact groups 1, 2, 3, 4 of contact array 22a. Accordingly, the values of these resistors is not critical and resistors R1, R2, R3, R4 can be approximately 5-k$\Omega$ and resistors R5, R6, R7, R8 can be approximately 1.3-k$\Omega$. Within the spirit of the invention, of course, other values may be used. It will also be appreciated that variations may be made in the implementation of drive/sense circuitry 46, e.g. the threshold voltage determinations may be made by a window comparator, Schottky diodes may be used, and other device or topology changes may be made, without departing from the spirit of the invention.

Those skilled in the art will appreciate that, in accordance with the preferred embodiment of the invention, signals DRIVE, OUT1-, OUT2-, OUT3-, OUT4-, SENSE may be driven by microprocessor 36 and that signals IN1, IN2, IN3, IN4 may be sensed by microprocessor 36 in a prescribed sequence, as suggested by the block diagram of FIG. 2. Such a sequence is controlled by a program residing in ROM 38 and/or RAM 40 the instructions of which are accessed and executed by microprocessor 36. In a manner analogous to that described by reference to FIG. 4, the circuit of FIG. 5 is used to poll contact array 22a to detect at least momentary coupling between contacts of different groups 1, 2, 3, 4 by circuit coupling structure 20 of ID unit 10. Thus, a given one of OUT1-, OUT2-, OUT3-, OUT4-, e.g. OUT1-, is driven low (active) while all others are driven or allowed to float high (inactive), and then DRIVE is driven high (active) to enable a selected FET to turn on, or conduct, so that the corresponding contact group effectively is grounded. With SENSE high (active), IN1, IN2, IN3, IN4 are sensed by microprocessor 36's reading of the four input data lines for comparison of the sense inputs to the drive outputs.

If there is no short or circuit coupling structure engagement between any contact in contact group 1 and any contact in any other group, then IN1 should be high (active) and IN2, IN3, IN4 should be low (inactive). If instead there is such a short or such engagement, e.g. involving a contact in group 1 and a contact in group 3, then IN1 would be high (active), IN3 would be high (active) and IN2, IN4 would be low (inactive). In such event, the microprocessor would complement the driven outputs by driving or allowing OUT1- to float high (inactive) and by driving OUT3- low (active). IN3 should now be high (active) and IN1, IN2, IN4 should be low (inactive). If sensing indicates that IN1 instead is high (active), then it is concluded that an incidental short-circuit condition exists between at least one of the contacts in group 1 and at least one of the contacts in group 3. If instead sensing indicates that IN1 now is low (active), then it is concluded that circuit coupling means 20 not only is engaging at least one contact in group 1 and at least one contact in group 3, but that it is properly biased so that the identification code can be read therefrom in accordance with predetermined pulse amplitude and timing requirements of IC 16.

It will be understood that if circuit coupling means 20 is in a position of engagement of a contact in group 1 and a contact in group 3 but is in an orientation such that IC 16 is reverse biased, then no circuit coupling, or closure, will be indicated by the partial polling sequence described above. But a short time later in the polling sequence when OUT3- is driven low (active) and OUT1-, OUT2-, OUT4- are driven or allowed to float high (inactive), IN1 will sense high (active) rather than low (inactive). Then, complementing the drive outputs so that OUT1- is driven low (active) and OUT3- is driven or allowed to float high (inactive) will bias IC 16 such that its identification can be read. Thus, in accordance with the preferred embodiment and by the preferred method of the invention, the engagement of point contacts 18a, 18b of ID unit 10 in either orientation with adjacent planar contacts 28 is sensed and the code stored therein is read.

Figure 6:
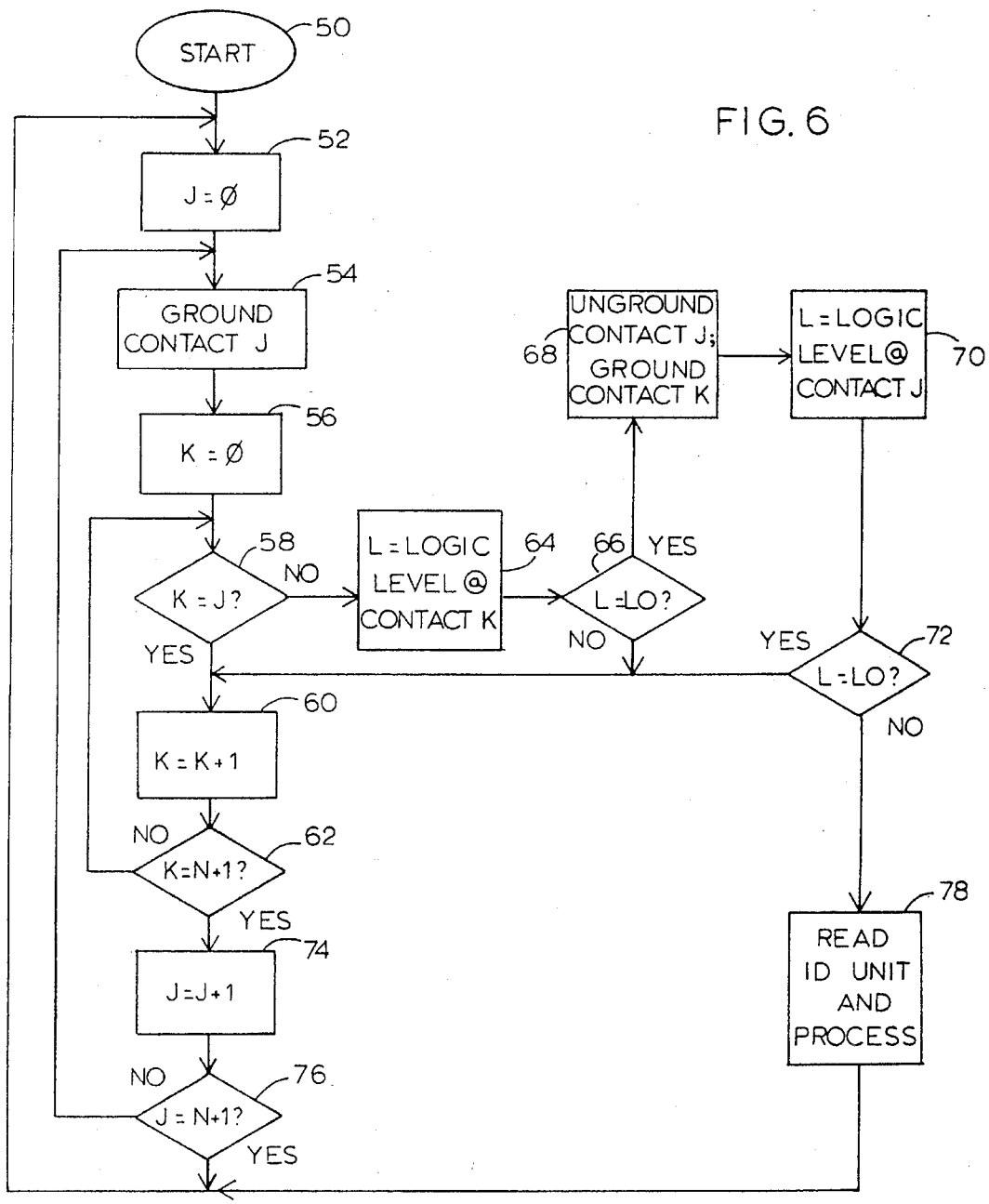
FIG. 6 is a flowchart illustrating a method by which groups of contacts within the ID reader's contact array may be sensed and read by the microprocessor shown in FIG. 3.

Turning now to FIG. 6, a flowchart representing the steps by which contact array 22a may be polled by microprocessor 36, the. method of the invention may be better understood. It will be understood, in connection with FIG. 6, that J and K are modulo-N and modulo-(N−1) counters that represent one less than the selected contact group number 1, 2, 3, 4 (e.g. when J=0, contact group 1 is selected); L represents the logical complement of the state of a given contact group sense input IN1, IN2, IN3, IN4 (and thus the actual state of the corresponding contact group, uninverted by NAND gates N5, N6, N7, N8 of FIG. 5) and N represents one fewer than the number of contact groups (e.g. N=3, in accordance with the preferred embodiment).

The contact array polling process starts at 50. J is initialized at 52 and at 54 the contact group corresponding to the current value of J is grounded (e.g. by driving one of OUT1-, OUT2-, OUT3-, OUT4- of FIG. 6 low active). At 56 K is initialized and at 58 is compared with J. The first time through the loop, K=J and so K is incremented at 60. Assuming that K is not greater than N+1 (e.g. four), as determined at 62, K is again compared to J at 58. This time, K>J and at 64 L is set to the logic level of the contact group corresponding to K. At 66 the current contact group's logic level (the logical complement of sense inputs IN1, IN2, IN3, IN4 of FIG. 6) is compared with a logic low. If it is not low (active), then steps 60, 62, 56, 58, 64 and 66 are repeated causing the levels of successive contact groups to be read and compared.

When a low level is detected on one of the contact group sense input signals, at 68 the grounded contact group corresponding to J is allowed to float and the contact group corresponding to K is grounded, effecting a inter-contact group polarity swap or reversal as described above by reference to FIGS. 4 and 5. At 70 L is set to the logic level of the contact group corresponding to J, i.e. one of the IN1, IN2, IN3, IN4 sense input signals is read by microprocessor 36. If the logic level of this contact group represented by L is low, then the read, compare and if-low-then-swap steps again are repeated. If after the polarity reversal between the contact groups represented by J and K, the contact group corresponding to J is not a low logic level-despite the fact that grounding a first contact group (corresponding to J) caused a second contact group (corresponding to K) to go to a low logic level—then there is a condition of non-symmetric impedance between the two contact groups that is indicative of engagement with one or more of the planar contacts in each contact group by circuit coupling structure 20. Thus, at 78 it is assumed that code-producing IC 16 is operatively coupled with code reader 20 and ID unit 10 is read and its identification code is processed.

It will be appreciated that, after reading ID unit 10 and processing the code read therefrom, polling of contact array 22a starts over at 52 with the reinitialization of J and K. In this manner, contact array 22a is polled repeatedly by grounding one of the four contact groups while the others are floating and, if a low-impedance condition is found therebetween, the signals energizing the two groups are reversed to determine if the low-impedance condition is linear or symmetric (indicating an incidental short between the two contact groups, which may be ignored if possible, e.g. by driving the contact groups between which there appears to be a short to the same high or low voltage or by masking the effect of the apparent short on all contact group pairs other than a pair determined to be engaged by circuit coupling structure 20) or non-linear or asymmetric (indicating engagement therebetween by circuit coupling structure 20). When its presence is indicated, IC 16 by the preferred method of the invention already is biased so that, in response to predetermined drive signal amplitude and timing, its stored identification code can be read by microprocessor 36.

It will be appreciated that energizing and reading of two-operative-terminal IC 16 in accordance with its predetermined protocol is performed by driving/sensing the indicated pair of contact groups via corresponding ones of OUT1-, OUT2-, OUT3-, OUT4 and IN1, IN2, IN3, IN4 (refer to FIGS. 3 and 5). Those of skill in the arts will appreciate that, because physical and electrical engagement between ID unit 10 and contact array 22a may be only momentary, the polling of the entire detector contact array-including reading of IC 16 when such is indicated—must be accomplished within a fraction of a second. Such is well within the capability of conventional microprocessors operating at moderate clock speeds. It will also be appreciated that, if an ambiguous forward- and reverse-impedance condition is detected between contact groups, the preference might be to assume that circuit coupling structure 20 is in engagement therewith and to proceed with an attempt to read an identification code therefrom in accordance with the protocol specified for IC 16. If such is not successful, it fairly may be concluded at least that there is no properly responsive circuit coupling structure 20 properly engaged with contact array 22a in any one of the infinite positions and orientations that will enable its code to be read.

Turning now to FIG. 7, some important aspects of the geometry and arrangement of plural contacts 28 within contact array 22a are described. It may be seen that the arrangement of plural contacts 28 is such that no contact in a given contact group 1, 2, 3, 4 (so-labeled) is adjacent another contact in the same group. By dimensioning contacts 28 and the spaces 30 interposing them as described above by reference to FIG. 2, and by connecting contacts 28 in parallel to form four contact groups 1, 2, 3, 4, it may be seen that there is only a minuscule possibility of positioning or orienting point contacts 18a, 18b of ID unit 10 in physical engagement with target contact means 26 without operative electrical coupling between different groups of contacts 28 in such a manner as to render ID unit 10 readable. Such improbable positioning and orientation would correspond with a condition in which one or both point contacts 18a, 18b were in engagement entirely within gaps 30 or entirely outside the perimeter of contact array 22a. It will be understood that an alternative number of contacts 28 might be grouped, or that other grouped contact arrangements might be made, that are effective in minimizing the number and size of these so-called "dead zones", thereby to maximize the sensitivity of code reader 20 to point contacts engagement by ID unit 10 without unduly complicating code reader 22, within the spirit of the invention.

The orientation of contacts 28 relative to the typically passing-motion type of contact that is contemplated by the invention—especially in the context of a skier wearing ID unit 10 who makes what probably would be sliding contact in what may be thought of as a wiper action—prefers the generally horizontal orientation of both dual point contacts 28 and plural planar hexagonal contacts 28 as indicated in FIGS. 1, 2 and 7, the latter orientation of which may be fixed by stationarily mounting code reader 22 (which of course otherwise may be portable, as is ID unit 10) in a desired location, e.g. at the entry to a ski lift. In other words it is preferable that an axis along which contacts of the same group are aligned be parallel with the axis along which axially aligned point contacts 18a, 18b are most likely to slide. This further decreases the possibility that engagement by circuit coupling structure 20 will go undetected by code reader 22, since any sliding motion will tend ultimately to position point contacts 18a, 18b clear of such dead zones and fully operatively within a given response zone pair 32 (refer to FIG. 2).

The methods of the invention now may be understood, in view of the preferred embodiment described above. The invention provides an ambi-orientational method for automatically interrogating a uni-directional, two-terminal, code-producing circuit such as IC 16 of the preferred embodiment. The method involves energizing two terminals, e.g. terminals 16a, 16b, of the circuit with a first signal pair of first polarity, e.g. complementarily driving signals OUT1- and OUT3- such that one is low (active) and the other is high (inactive) to produce a potential difference of a first polarity (positive or negative) between contact groups 1, 3 with which is engaged circuit coupling structure 20. The method next involves measuring the voltage difference between the two terminals, e.g. by sensing the logic levels of IN1, IN3, and comparing such difference with predetermined criteria, e.g. whether they are of the same or opposite logic level, to produce an indication regarding the mating orientation of the two terminals relative to such first signal pair, e.g. microprocessor 36 detects that grounding one contact group causes another to sense low but that the reverse is not true, and concludes that there is a non-linear or asymmetric impedance condition between the contact groups indicating the presence of a reverse-biased IC 16.

The method next implicitly involves the determination whether the measuring-comparing step indicates a mating orientation of IC terminals 16a, 16b that is the reverse of a desired mating orientation in which IC 16 can be read. This is because, in accordance with the preferred method, the determination that a non-linear or asymmetric impedance condition exists between the contact groups is performed by energizing contact group pairs with such polarity and in such order that IC 16 is assurably reverse-biased when its presence is determined. The method thus involves automatically energizing the two terminals of the circuit with a second signal pair of reverse polarity from the first polarity, e.g. drive signals OUT1-, OUT3- are both complemented, or are energized with a reverse polarity signal pair, by microprocessor 36 such that the one which was previously high now is low, and vice versa. With IC 16 now properly biased, e.g. with a low level, or logic zero, (circuit ground reference) signal on one terminal and a high level, or logic one, (power/data) signal on the other, for normal operation, the final step of the preferred method is performed by which two-terminal, code-producing circuit 16 is read in accordance with its device-specific read protocol. Thus, the method is described as being ambi-orientational because it automatically can read uni-directional IC 16 in either orientation of ID unit 10 relative to a given pair of adjacent contacts 28 of code reader 22.

The preferred method for scanning a plural contact array, responsive to physical contact by a code-producing unit such as ID unit 10, now also may be understood. The method involves first energizing selected ones of plural arrayed contacts at a first signal level, e.g. driving OUT1- low (active) effectively to ground contact group 1; and second energizing selected other ones of said plural arrayed contacts at a second signal level different from said first signal level, e.g. driving OUT3- or allowing to it to float high (inactive) effectively to allow contact group 3 to be pulled up by resistor R3 to the level of $V_{DD}$. The method further involves sensing the signal level difference between the selected ones and the other ones of the plural arrayed contacts, e.g. reading IN1, IN3, wherein the signal levels in accordance with the preferred embodiment are either low or high and represent binary (boolean) values, and comparing the difference with a predetermined value to determine whether the difference indicates physical contact with code-producing unit 10, e.g. determining whether IN1 is high (active) and IN3 is low (inactive), wherein the difference in accordance with the preferred embodiment of the invention is represented by a logical combination of binary (boolean) values and the comparison in accordance therewith is with a binary (boolean) value. It will be appreciated that such sensing and comparing steps, within the spirit of the invention, may involve analog, rather than discrete, levels and values, e.g. by use of window comparators and associated analog drive/sense circuitry.

The preferred scanning method next involves a determination whether physical contact, of the selected ones and the selected others of plural arrayed contacts 28, with code-producing unit 10 is indicated, e.g. by the detection of a non-linear or asymmetric impedance condition as described above and as illustrated by FIG. 6, and, if such is indicated, then determining whether energization of the first and other selected ones of contacts 28 is of a polarity which is predefined by IC 16 to enable the reading of a code therefrom. This is the step that is implicitly performed as described above in accordance with the preferred embodiment and method whereby, for example, OUT1-, OUT3 are complemented to drive OUT1- high (inactive) and OUT3- low (active) and it is determined whether IN1 and IN3 track one another, level-wise, regardless of the polarity of the drive signal pair OUT1-, OUT3- (indicating a linear or symmetric, low-impedance condition characteristic of an incidental short circuit), or whether instead IN1 and IN3 track one another only given certain conditions on OUTi-, OUT3- (indicating a non-linear or asymmetric, low-impedance condition characteristic of a non-linear device such as the integral diode of IC 16).

The next step involves either reading the code from code-producing unit 10 directly, in the case of the proper, predefined energization polarity, or first reversing the energization polarity, e.g. by complementing OUTi-, OUT3-, and thereafter reading the code from code-producing unit 10. If physical conduct between the selected ones and other selected ones of contacts 28 and code-producing unit 10 is not indicated, then the second energizing step and steps subsequent thereto are repeated, but this time with different selected others of the plural arrayed contacts, e.g. by driving OUT4- or allowing it to float high (inactive), rather than OUT3-, to determine by sensing IN1 and IN4 whether there is a low impedance condition between contact groups 1 and 4 which indicates a properly biased IC 16 thereat. Finally, the first energizing step and steps subsequent thereto are repeated, but this time with different selected ones of the plural arrayed contacts, e.g. by driving OUT3- low (active), rather than OUT1-, to determine by sensing IN1 and IN3 whether there is a low impedance condition between contact groups 3 and 1 which indicates a properly biased IC 16 thereat.

The applications and advantages of the invention are now readily comprehended. The identification number which is read from ID unit 10 may be sent to a central computer for verification (or may be processed at code reader site based upon previously downloading to the site the required verification data) to determine whether the wearer thereof is authorized to pass the checkpoint. For example, a skier wearing portable ID unit 10 may be a season ticket holder, which authorization would be verified and the skier allowed to board a ski lift. On the other hand, the skier may be unticketed, and thus he or she may be an unauthorized user of the ski lift, in which case a indicator panel monitored by a lift operator would indicate the attempted unauthorized access and the lift operator could prevent the skier from boarding the lift (such access control instead might be automatic, e.g. by use of a lockable turnstile).

Other applications would include counting the number of times a skier boards a particular lift, which information might be interpretable by the ski resort owner/operator as an indication of lift utilization, average downhill runtime, average and peak use of lifts, etc. Such information would be maintained in a database under control of the resort owner/operator, and might lead to future resort improvements, changes in daily and seasonal opening and closing times, grooming or redesign of certain runs, incidence of theft of services by unauthorized users, etc. Those of skill in the art will appreciate that numerous applications of the invention are possible, whether ski related or otherwise. It is believed that the apparatus and method of the invention provide an unprecedentedly large-target area by which contact can readily be made for identification, access control and monitoring of persons passing a checkpoint, while maintaining high sensitivity to momentary or brushing contact thereby and a great tolerance for incidental adjacent-contact bridging, as by ice, water or even a stray finger. The invention provides such advantages in a simple system, with a cost-effective apportionment of cost between high-volume ID units and relatively low-volume code readers.

Accordingly, while preferred method and apparatus of the invention have been described herein, it is appreciated that further modifications are possible that are within the scope of the invention.

It is claimed and desired to secure by Letters Patent:

1. A portable identification code-producing unit for use with a code reader having an array of energizable planar contact pairs, the unit comprising:

a housing a solid state device mounted to the housing and having a pair of operative terminals, and producing a signal bearing an identification code;

a pair of electrical point contacts projecting outwardly from the housing and operatively connected with said pair of terminals, said electrical point contacts of said pair each terminating in a distal end that is spheroidal in shape, each distal end having a small-pattern contact surface area and being spaced from one another a predetermined distance, so that a two-lead circuit can be completed, with each contact being associated with a separate lead of the circuit; and means connected with said housing for extending at least partially around a limb of a user so that the contacts are exposed for direct electrical-physical contact with a code reader.

2. The portable identification code-producing unit according to claim 1, wherein the contacts extend outwardly from the housing at about a right angle.

3. A user-wearable identification unit comprising:

an identification device producing a signal bearing an identification code for communication;

a pair of outwardly-facing, outwardly-extending electrical point contacts operatively connected to said identification device, said contacts each having a distal end that is spheroidally shaped to define a small-pattern contact surface area, and being spaced from one another a predetermined distance so that a two-lead circuit can be completed by placing said contacts in electrical-physical contact with a code reader; and means for securing said device and said contacts to a user so that the contacts are exposed for direct electrical-physical contact with a code reader.

4. The user-wearable identification unit according to claim 3, wherein the contacts extend outwardly from the housing at about a right angle.

5. A user-wearable identification unit comprising:

an identification device producing a signal bearing an identification code for communication;

a pair of outwardly-facing, outwardly-extending, electrical point wiper contacts operatively connected to said identification device, said contacts each having a distal end that is spheroidally shaped, said contacts being spaced from one another a predetermined distance so that a two-lead circuit can be completed by placing said contacts in electrical-physical contact with a code reader; and means for securing said device and said contacts to a user so that the contacts are exposed for direct electrical-physical, passing-motion contact with a code reader.

6. The user-wearable identification unit according to claim 5, wherein each of the contacts extends outwardly from the housing at about a right angle.

7. A user-wearable identification unit comprising:

an identification device producing a signal bearing an identification code for communication;

a pair of outwardly-facing, outwardly-extending, protuberant electrical point wiper contacts operatively connected to said identification device, said contacts being spaced from one another a predetermined distance so that a two-lead circuit can be completed by placing said contacts in electrical-physical contact with a code reader; and means for securing said device and said contacts to a user so that the contacts are exposed for direct electrical-physical, passing-motion contact with a code reader.

8. The user-wearable identification unit according to claim 7, wherein each of the contacts extends outwardly from the housing at about a right angle.

9. The user-wearable identification unit according to claim 7, wherein each of the contacts has a distal end that is shaped to define a small-pattern contact surface area.

10. A portable identification code-producing unit for use with a code reader having an array of energizable planar contact pairs, the unit comprising:

a housing;

a solid state device mounted to the housing and having a pair of operative terminals, and producing a signal bearing an identification code;

a pair of protuberant electrical point contacts projecting outwardly from the housing and operatively connected with said pair of terminals, said electrical point contacts of said pair each terminating in a distal end having a small-pattern contact surface area and being spaced from one another a predetermined distance, so that a two-lead circuit can be completed, with each contact being associated with a separate lead of the circuit; and means connected with said housing for extending at least partially around a limb of a user so that the contacts are exposed for direct electrical-physical contact with a code reader.

11. The portable identification code-producing unit according to claim 10, wherein the contacts extend outwardly from the housing at about a right angle.

12. The portable identification code-producing unit according to claim 10, wherein the distal ends of the contacts are spheroidal in shape.

13. The portable identification code-producing unit according to claim 11, wherein the distal ends of the contacts are spheroidal in shape.

14. A user-wearable identification unit comprising:

an identification device producing a signal bearing an identification code for communication;

a pair of outwardly-facing, outwardly-extending, protuberant electrical point contacts operatively connected to said identification device, said contacts each having a distal end that is shaped to define a small-pattern contact surface area, and being spaced from one another a predetermined distance so that a two-lead circuit can be completed by placing said contacts in electrical-physical contact with a code reader; and means for securing said device and said contacts to a user so that the contacts are exposed for direct electrical-physical contact with a code reader.

15. The user-wearable identification unit according to claim 14, wherein the distal ends of the contacts are spheroidal in shape.

16. The user-wearable identification unit according to claim 14, wherein the contacts extend outwardly from the housing at about a right angle.

17. The user-wearable identification unit according to claim 16, wherein the distal ends of the contacts are spheroidal in shape.

18. A user-wearable identification unit comprising:

an identification device producing a signal bearing an identification code for communication;

a pair of outwardly-facing, outwardly-extending, protuberant electrical point wiper contacts operatively connected to said identification device, said contacts each having a distal end that is spheroidally shaped to define a small-pattern contact surface area, each extending outwardly from the housing at approximately a right angle, and being spaced from one another a predetermined distance so that a two-lead circuit can be completed by placing said contacts in electrical-physical contact with a code reader; and means for securing said device and said contacts to a user so that the contacts are exposed for direct electrical-physical, passing-motion contact with a code reader.

* * * * *